(12) United States Patent
Kobayashi et al.

(10) Patent No.: US 10,924,297 B2
(45) Date of Patent: Feb. 16, 2021

(54) AGENT SYSTEM INCLUDING AN INFORMATION PROCESSING DEVICE FOR EXECUTING AN AGENT

(71) Applicant: OMRON Corporation, Kyoto (JP)

(72) Inventors: Tatsuhiro Kobayashi, Yokohama (JP); Takehiro Kuratani, Tokyo (JP); Hideto Matsushita, Otsu (JP)

(73) Assignee: OMRON Corporation, Kyoto (JP)

( * ) Notice: Subject to any disclaimer, the term of this patent is extended or adjusted under 35 U.S.C. 154(b) by 177 days.

(21) Appl. No.: 16/108,137

(22) Filed: Aug. 22, 2018

(65) Prior Publication Data

US 2018/0359110 A1 Dec. 13, 2018

Related U.S. Application Data

(63) Continuation of application No. PCT/JP2017/002917, filed on Jan. 27, 2017.

(30) Foreign Application Priority Data

Mar. 15, 2016 (JP) .................................. 2016-051380

(51) Int. Cl.
*H04L 12/28* (2006.01)
*G05B 15/02* (2006.01)
(Continued)

(52) U.S. Cl.
CPC .......... *H04L 12/2814* (2013.01); *G05B 15/02* (2013.01); *G06F 8/60* (2013.01);
(Continued)

(58) Field of Classification Search
CPC ............... H04L 12/2814; H04L 67/303; H04L 67/2861; H04L 12/282; H04L 12/2809;
(Continued)

(56) References Cited

U.S. PATENT DOCUMENTS 6,668,376 B1 12/2003 Wang et al.
8,154,608 B2 4/2012 Ishii
(Continued)

FOREIGN PATENT DOCUMENTS

JP 2007-194942 A 8/2007
JP 2013-512490 A 4/2013
JP 2014-99113 A 5/2014

OTHER PUBLICATIONS

Anonymous, "Softmodem", Wikipedia, Retrieved from the Internet: URL:https://en.wikipedia.org/w/index.php?title=Softmodem&oldid=693385515, Dec. 2, 2015, Retrieved on May 20, 2019, Relevance is indicated in the EESR mailed on May 31, 2019.
(Continued)

*Primary Examiner* — Soe Hlaing
(74) *Attorney, Agent, or Firm* — Metrolex IP Law Group, PLLC (57) ABSTRACT

A device includes an identification unit that identifies at least one external device, a communication unit that communicates with the external device, an agent generation unit that generates, using hardware included in the external device as an interface, an agent that performs processing predetermined for each external device on behalf of the external device, and an agent execution unit that executes the agent.

12 Claims, 9 Drawing Sheets

(51) Int. Cl.
*G06F 21/31* (2013.01)
*G06F 8/60* (2018.01)
*G06F 21/12* (2013.01)
*G06F 21/44* (2013.01)
*G06F 9/445* (2018.01)
*H04L 29/08* (2006.01)
*G06F 21/60* (2013.01)
*H04W 12/06* (2021.01)
*H04W 12/04* (2021.01)

(52) U.S. Cl.
CPC ........ *G06F 9/44505* (2013.01); *G06F 21/126* (2013.01); *G06F 21/31* (2013.01); *G06F 21/445* (2013.01); *G06F 21/606* (2013.01); *H04L 12/282* (2013.01); *H04L 12/2809* (2013.01); *H04L 67/2861* (2013.01); *H04L 67/303* (2013.01); *G05B 2219/2642* (2013.01); *G06F 2221/2111* (2013.01); *G06F 2221/2149* (2013.01); *H04L 67/12* (2013.01); *H04W 12/04* (2013.01); *H04W 12/0609* (2019.01)

(58) Field of Classification Search
CPC ... H04L 67/12; G06F 21/606; G06F 9/44505; G06F 21/445; G06F 21/126; G06F 8/60; G06F 21/31; G06F 2221/2149; G06F 2221/2111; H04W 12/04; H04W 12/0609; G05B 15/02; G05B 2219/2642
See application file for complete search history.

(56) References Cited

U.S. PATENT DOCUMENTS

| | | | | |
|---|---|---|---|---|
| 2004/0128676 | A1* | 7/2004 | Wang | G06F 9/4415 719/321 |
| 2013/0013088 | A1* | 1/2013 | Liekens | H04L 12/66 700/90 |
| 2014/0070925 | A1* | 3/2014 | Shin | G05B 15/02 340/12.5 |
| 2014/0135952 | A1* | 5/2014 | Maehara | G05B 15/02 700/90 |
| 2016/0094994 | A1* | 3/2016 | Kirkby | G11B 27/028 380/270 |

OTHER PUBLICATIONS

Extended European search report (EESR) dated May 31, 2019 in a counterpart European patent application.

Takahiro Ito et al., "Coordinated Environment for PUCC Sensors and Consumer Electronics", IPSJ Symposium Series Symposium on Multimedia, Distributed, Cooperative and Mobile Systems (DICOMO2008) Ronbunshu, Jul. 2008, pp. 2000 to 2007, vol. 2008, No. 1, ISSN 1882-0840, particularly p. 2002, '3. Sekkei' Relevance is indicated in the (translated) ISR/Written Opinion dated May 9, 2017.

English translation of the International Search Report of PCT/JP2017/002917 dated May 9, 2017.

English translation of the Written Opinion of PCT/JP2017/002917 dated May 9, 2017.

\* cited by examiner

Metadata

| Name | Device name |
|---|---|
| Description | URL for agent catalog available |
| ID | Identifier unique to individual device |

FIG. 4

Agent catalog

| Name | | | Device name |
|---|---|---|---|
| Type | | | Device type |
| Sensors | steps | type | Type of sensor data |
| | | min | Minimum of sensor data |
| | | max | Maximum of sensor data |
| | | bit | Number of bits of sensor data |
| | heartbeat | type | ... |
| | | min | ... |
| | | max | ... |
| | | bit | ... |
| Custom_code | | | Code describing details and procedures of processing |

Sensor definitions: type, min, max, bit (and the ... rows)

Processing definitions: Custom_code

Agent catalog

| | | | | |
|---|---|---|---|---|
| Name | | | | Device name |
| Type | | | | Device type |
| Sensors | steps | | type | Type of sensor data |
| | | | min | Minimum of sensor data |
| | | | max | Maximum of sensor data |
| | | | bit | Number of bits of sensor data |
| | heartbeat | | type | ... |
| | | | min | ... |
| | | | max | ... |
| | | | bit | ... |
| Custom_code | | | | Code describing details and procedures of processing |
| User Name | | | | User identifier |
| Scrambling_code | | | | Key information |

Sensor definitions (columns: type, min, max, bit)

Processing definitions

AGENT SYSTEM INCLUDING AN INFORMATION PROCESSING DEVICE FOR EXECUTING AN AGENT

CROSS REFERENCE TO RELATED APPLICATIONS

This application is a continuation application of International Application No. PCT/JP2017/002917, filed on Jan. 27, 2017, which claims priority based on the Article 8 of Patent Cooperation Treaty from prior Japanese Patent Application No. 2016-051380, filed on Mar. 15, 2016, the entire contents of which are incorporated herein by reference.

FIELD

The disclosure relates to a system including an agent that performs processing of a device on behalf of the device.

BACKGROUND

A system widespread nowadays may connect various devices to a network to allow multiple devices to work in a cooperative manner. For example, Patent Literature 1 describes a system including multiple household electrical devices connected to a network, multiple agents corresponding to the household electrical devices, and a master computer for managing the agents.

In the system described in Patent Literature 1, the master device central to the network executes the agents corresponding to the household electrical devices. Each agent is responsible for a part of control over the corresponding household electrical device. This structure can achieve optimum control over the multiple household electrical devices (e.g., minimizing power consumption), and also transfer a model defined for each household electrical device to another master device.

CITATION LIST

Patent Literature

Patent Literature 1: Japanese Unexamined Patent Application Publication No. 2014-099113

SUMMARY

Technical Problem

As the network includes more devices, adding functions to such devices will cost more. For example, the agent system described in Patent Literature 1 can collect and manage information but relies on the household electrical devices to generate information. Adding new functions to the household electrical devices thus involves software update in the household electrical devices. The cost for such updates increases as the number of devices increases.

Additionally, the household electrical devices have limited processing capabilities. To add functions, such household electrical devices will need more robust hardware. This upsizes the devices and increases power consumption.

The agent system described in Patent Literature 1 is connected to a server and to multiple devices through the network, and thus involves the issue of network security. In response to this, the household electrical devices may have additional security functions. This also upsizes the devices and increases power consumption.

In response to the above issue, one or more aspects are directed to a system that controls devices connected to a network using an agent to reduce costs.

Solution to Problem

An information processing device according to one aspect includes an identification unit that identifies at least one external device, a communication unit that communicates with the external device, an agent generation unit that generates, using hardware included in the external device as an interface, an agent that performs processing predetermined for each external device on behalf of the external device, and an agent execution unit that executes the agent.

The information processing device according to one aspect generates and executes the agent corresponding to the external device. The agent is software for performing processing that is previously performed by software included in the external device. The agent executes the function predetermined for each external device using hardware included in the external device as an interface. More specifically, the external device simply performs input-output processing. The device executing the agent performs other associated processing.

In this system, the external device can simply include an interface and small-scale hardware associated with the interface. The external device can eliminate a large-scale software execution unit for performing other functions. This reduces the costs of the external device. This system can further update the functions of multiple external devices by updating the corresponding agents.

The hardware to serve as the interface is typically a sensor or an actuator but may not be these elements. Any piece of hardware that interacts with the real world may serve as the interface.

An agent may be generated as appropriate, or an agent may be generated and stored for reuse. An agent once generated may be reusable unless the corresponding external device has undergone function updates.

The information processing device according to one aspect may further include a device information obtaining unit that obtains metadata from the external device, and obtains, using the obtained metadata, device information indicating processing to be performed by the agent on behalf of the external device. The metadata is data for identifying the external device. The agent generation unit may generate the agent using the device information.

The metadata refers to information for identifying the corresponding external device. The metadata includes, for example, an identifier, an attribute, and a serial number of the corresponding external device, but may not be these items of information. In some embodiments, the metadata may be a uniform resource locator (URL) indicating the location at which the above information is available. Using the metadata, the device information obtaining unit obtains the corresponding device information.

The device information is information about the processing (function) to be performed by the hardware included in the external device. The device information includes, for example, information about the hardware included in the external device (e.g., details of the information obtainable by accessing the hardware) or a method for generating or processing data using the information.

As described above, the external device may transmit simply the information for identifying the external device, whereas the device information obtaining unit may obtain specific information using the metadata. This structure enables the functions associated with the external device to be managed outside the external device.

In some embodiments, the communication unit may wirelessly connect to the external device using pairing, and the device information obtaining unit may obtain the metadata from the external device upon connection to the external device.

The metadata may be obtainable each time the external device is connected. This allows timely identification of the external device.

In some embodiments, the metadata may include a location at which the device information is available on a network, and the device information obtaining unit may obtain the device information from the location specified in the metadata.

The location at which the device information is available may be indicated by, for example, a URL, a uniform resource identifier (URI), or a network address. The device information is obtainable from the network and thus can be easily updated.

In some embodiments, the device information may include first information about data obtainable by the external device and second information about processing to be performed using the data. The agent may perform the predetermined processing using the first information and the second information.

The information processing device according to one aspect may be used in, for example, the system including the external device that simply provides data (e.g., sensor data) and the agent that generates or processes information using the data.

An information processing device according to a second aspect includes a communication unit that communicates with at least one external device, and an agent execution unit that executes, using hardware included in the external device as an interface, an agent that performs processing predetermined for each external device on behalf of the external device.

As described above, one aspect may provide the information processing device that executes the agent.

An agent system according to another aspect includes an information processing device that executes, using hardware included in at least one external device as an interface, an agent that performs processing predetermined for each external device on behalf of the external device, and a server device. The information processing device includes a device information obtaining unit that obtains device information about processing to be performed by the agent from the server device, and an agent generation unit that generates the agent using the device information. The server device includes a storage unit that stores the device information corresponding to the at least one external device, and a device information providing unit that transmits device information in response to a request from the information processing device.

As described above, one aspect may provide the system including the above information processing device and the server device. The server that manages the device information enables integrated management of the device information.

In some embodiments, the storage unit may store the device information in association with a user, the device information obtaining unit may transmit authentication information corresponding to the user to the server device, and the device information providing unit may transmit only device information corresponding to the user to the information processing device.

For example, the server device may store device information in association with a user who has pre-registered his or her information on the server device, and then authenticate the user before providing the device information. For example, the information processing device may transmit, to the server device, authentication information (e.g., a digital signature) corresponding to the user, and the server device may then distribute only the device information corresponding to the user.

In some embodiments, the device information may include key information linked to the external device, and the agent may use the key information to perform encrypted communication with the external device.

As described above, the key information corresponding to the external device may be transmitted to enable encrypted communication between the agent and the external device. Additionally, each individual external device may have different key information assigned to it to allow communication between the agent and only the external device as registered. In other words, the use of the different key information prevents connection from a spoofed device with the same model number as registered.

In some embodiments, the agent communicates with solely an external device having authentication information identical to the authentication information corresponding to the user, and the external device may be one of the at least one external device connected to the information processing device.

The external device and the agent may exchange information with a device connected externally to the system (e.g., a server for providing services, other external devices, or other users) through the network. To enhance the network security, the system may permit communication only with an external device having authentication information identical to the authentication information corresponding to the user.

Other aspects may provide an information processing device and an agent system that each include at least one of the units described above, an information processing method performed by the above information processing device, and a program causing a computer to implement the above information processing method. The processing or the units described above may be combined in any manner unless such combinations cause technical conflicts between them.

Advantageous Effects

One or more aspects reduce the costs of the system that controls devices connected to the network using the agent.

DETAILED DESCRIPTION

First Embodiment

One or more embodiments will now be described with reference to the drawings.

An agent system according to one or more embodiments includes at least one smart device, a master device or a computer that manages the smart device, and a management server.

The smart device (an external device according to one aspect) is a computer that operates with fewer resources than the master device. In one or more embodiments, the smart device is a wristband wearable computer that obtains an exercise amount of a user. The smart device may not be a wearable computer, but may be any computer that operates with limited resources. For example, the smart device may be an embedded computer in a household electrical appliance.

The agent system according to one or more embodiments allows software to be executed on the master device to perform the processing that is previously mainly performed by the smart device.

The agent system according to one or more embodiments will now be described briefly with reference to FIGS. 1A and 1B.

Figure 1A:
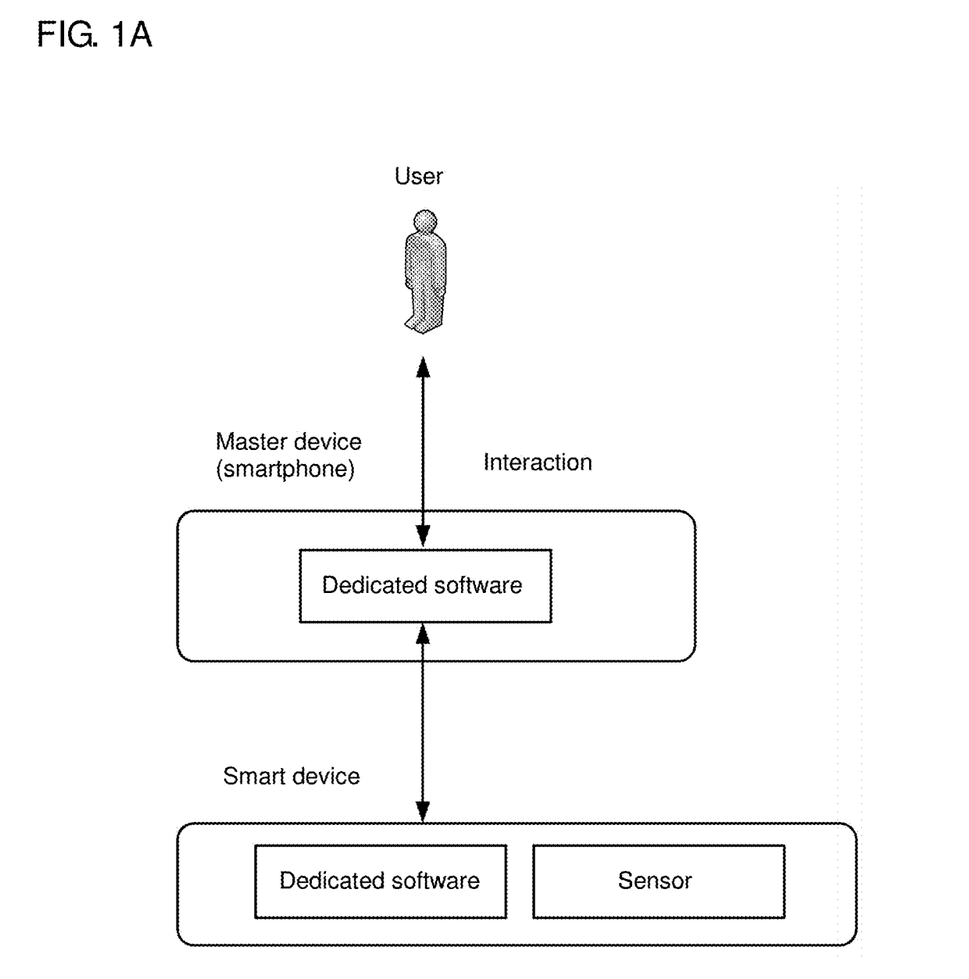
FIG. 1A is a diagram illustrating a known method for communication with a smart device.

FIG. 1A is a diagram showing a sequence of data in a known system in which a smart device and the master device (e.g., a smartphone) cooperate with each other. As shown in the figure, a smart device 20 contains dedicated software, and interacts with a user through software executed on the master device.

In this system, the smart device performs the device functions by executing its internal software, and thus cannot execute a large-scale program. The smart device also involves software update when appropriate to update the device functions. Additionally, the user prepares different pieces of application software for smart devices from different venders.

In response to this, the agent system according to one or more embodiments allows the software (an agent according to one aspect) executed on the master device to perform higher order processing that is previously performed by the smart device. The smart device thus functions simply as an interface with the real world.

Figure 1B:
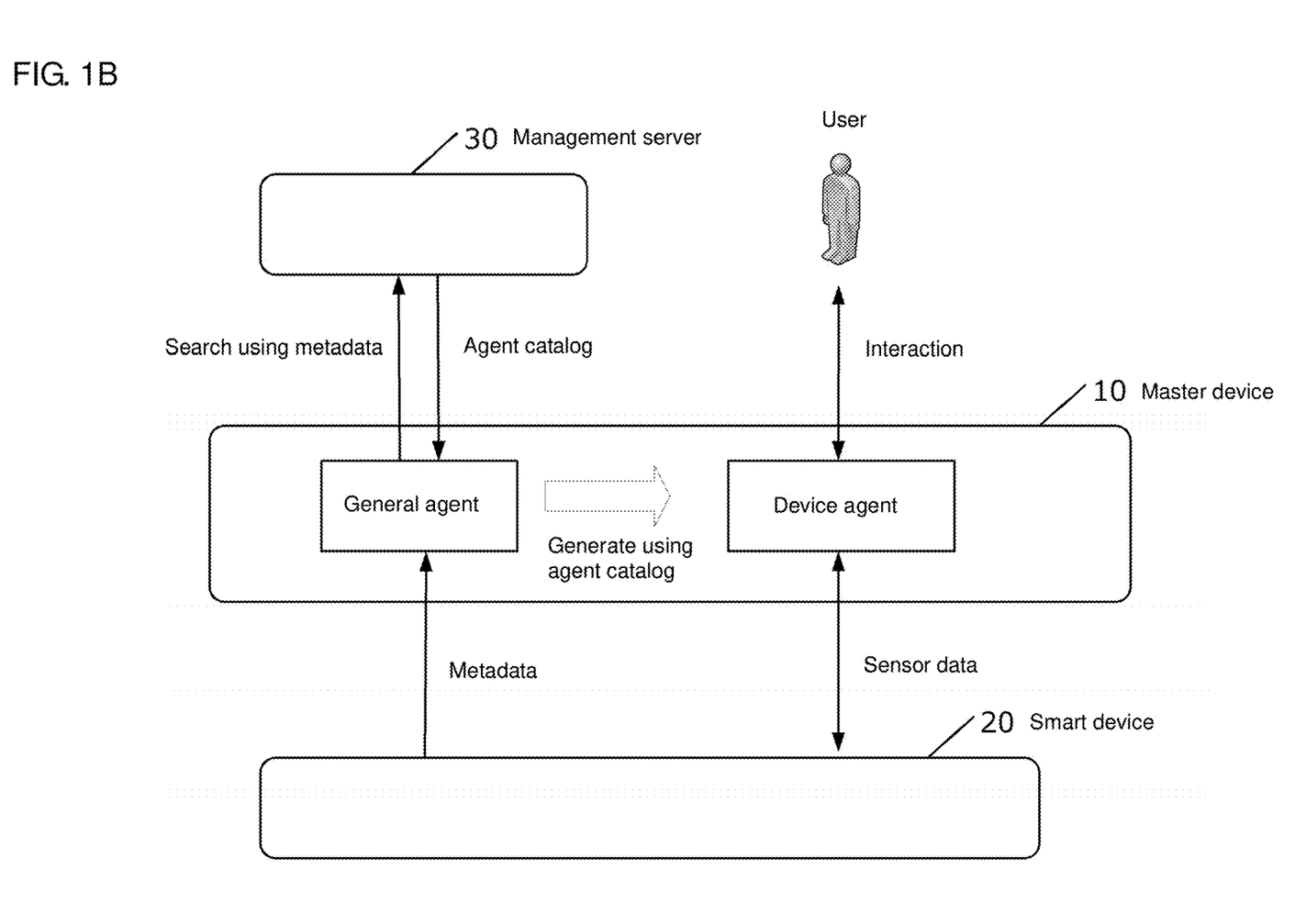
FIG. 1B is a diagram illustrating a method for communication with a smart device according to a first embodiment.

FIG. 1B is a diagram showing a sequence of data in one or more embodiments.

In one or more embodiments, the smart device 20 simply has two functions: (1) to transmit data (metadata) for identifying the smart device 20, and (2) to provide sensor data in response to a request. The smart device 20 according to one or more embodiments has no other functions (e.g., editing or processing obtained data, accessing a database, or providing a user interface).

The master device 10 is a mobile computer, such as a smartphone, owned by the user. The master device 10 generates and executes, using information obtained from the smart device 20, an agent that performs the functions of the smart device 20 on behalf of the smart device 20 (hereafter, a device agent). The device agent has an independent instance for each smart device 20. The device agent is a program module executable on the master device 10.

The master device 10 also executes a general agent, which is a program for generating the device agent.

A management server 30 is a server device that provides information for generating the device agent to the master device 10. More specifically, the management server 30 stores metadata for identifying a smart device and information including the code for generating a device agent (hereafter, an agent catalog) in an interrelated manner. The management server 30 transmits an agent catalog corresponding to the metadata.

In one or more embodiments, the general agent in the master device 10 obtains an agent catalog from the management server 30 using metadata. The general agent uses the obtained agent catalog to generate and execute a device agent corresponding to the smart device 20.

The device agent performs the processing of the smart device 20 on behalf of the smart device 20. The device agent obtains data from a sensor included in the smart device 20. The device agent also performs other processing of the smart device 20, including editing or processing the obtained data, accessing the database, generating a user interface, and interacting with the user.

Figure 2:
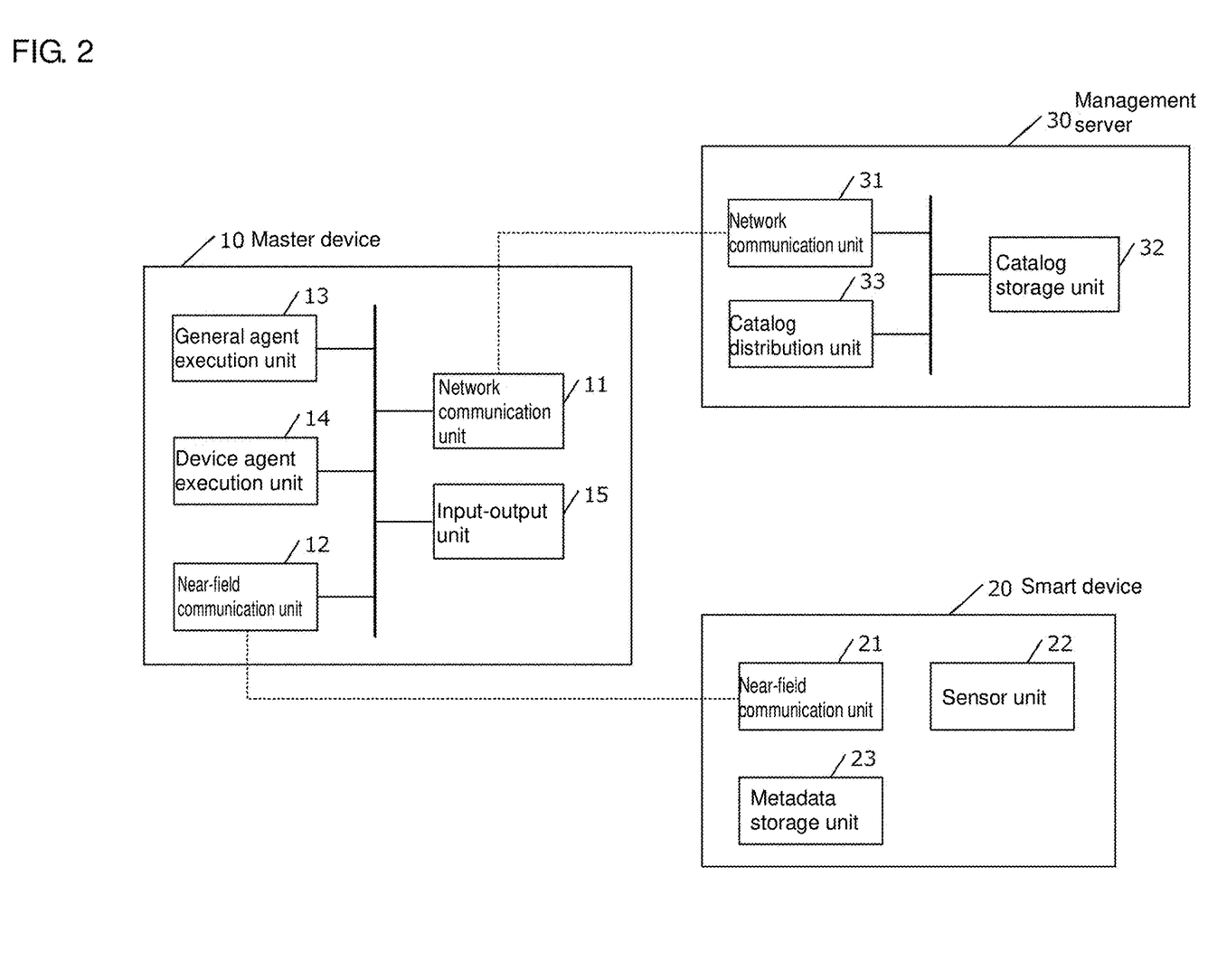
FIG. 2 is a functional block diagram illustrating an agent system according to a first embodiment.

The system configuration for providing the above functions will now be described with reference to FIG. 2. FIG. 2 is a functional block diagram of the system including the devices.

The configuration of the master device 10 will be described first.

The master device 10 according to one or more embodiments includes a network communication unit 11, a near-field communication unit 12, a general agent execution unit 13, a device agent execution unit 14, and an input-output unit 15.

The network communication unit 11 communicates with the management server 30 by accessing the network through a communication line (e.g., a mobile phone network).

The near-field communication unit 12 communicates wirelessly with the smart device 20. In one or more embodiments, the near-field communication unit 12 uses Bluetooth (registered trademark) connection for the communication. The near-field communication unit 12 stores information about the smart device 20 to be paired with, and is connected to the smart device 20 with a simple operation.

The general agent execution unit 13 executes an agent for generating the device agent (hereafter, a general agent). The general agent is a program module for monitoring connection and disconnection with and from the smart device 20, and generates the device agent (described later) corresponding to the smart device being connected.

The device agent execution unit 14 executes the device agent generated by the general agent. The device agent is a program module generated for each device being connected. The processing performed by the general agent and the device agent will be described in detail later.

The input-output unit 15 receives input operations performed by the user, and provides information to the user. In one or more embodiments, the input-output unit 15 includes a single touch panel display. More specifically, the input-output unit 15 includes a liquid crystal display and its controller, and a touch panel and its controller.

Each unit described above may be implemented by dedicated hardware or software, which may include a field programmable gate array (FPGA) or an application specific integrated circuit (ASIC), or a combination of these.

When the above units are implemented as software, the units function when a program stored in an auxiliary storage is loaded into the main memory and executed by a central processing unit (CPU) (the CPU, the auxiliary storage, and the main memory are not shown).

The configuration of the smart device 20 will now be described.

The smart device 20 according to one or more embodiments is a wristband wearable computer that obtains an exercise amount of the user. The smart device 20 includes a near-field communication unit 21, a sensor unit 22, and a metadata storage unit 23.

The near-field communication unit 21 communicates wirelessly with the master device 10. The near-field communication unit 21 functions in the same manner as the near-field communication unit 12 described above, and thus will not be described in detail.

The sensor unit 22 is a hardware unit including multiple sensors. When the smart device 20 is, for example, a wearable device, the sensors in the sensor unit 22 may include, but not limited to, a sensor for obtaining movement records or exercise amounts of the user and a sensor for managing the user's health. In one or more embodiments, the sensor unit 22 includes a heartbeat sensor that measures the heart rate of the user and a pedometer sensor that counts each step the user takes.

Figure 3:
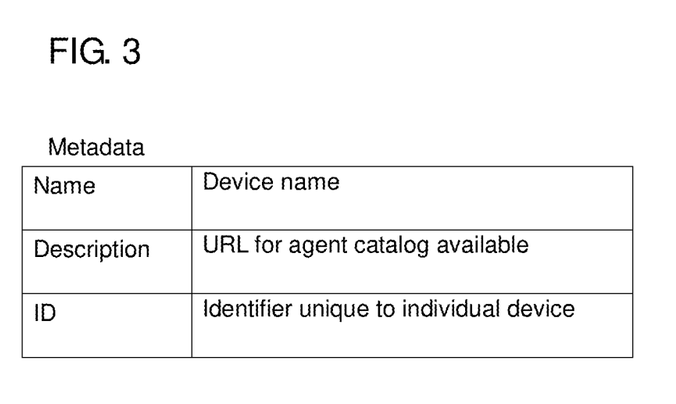
FIG. 3 is a diagram illustrating an example of metadata for a smart device.

The metadata storage unit 23 stores information for identifying the smart device 20 (metadata). FIG. 3 shows an example of the metadata. In one or more embodiments, the metadata includes (1) a device name, (2) a uniform resource locator (URL) at which the agent catalog (described later) is available, and (3) an identifier unique to each individual device. Although shown in a tabular form in FIG. 3, the metadata may be expressed in other formats, such as Extensible Markup Language (XML) and JavaScript Object Notation (JSON). The metadata is transmitted in response to a request from the master device 10.

The configuration of the management server 30 will now be described.

A network communication unit 31 communicates with the master device 10. The network communication unit 31 functions in the same manner as the above network communication unit 11, and will not be described in detail.

Figure 4:
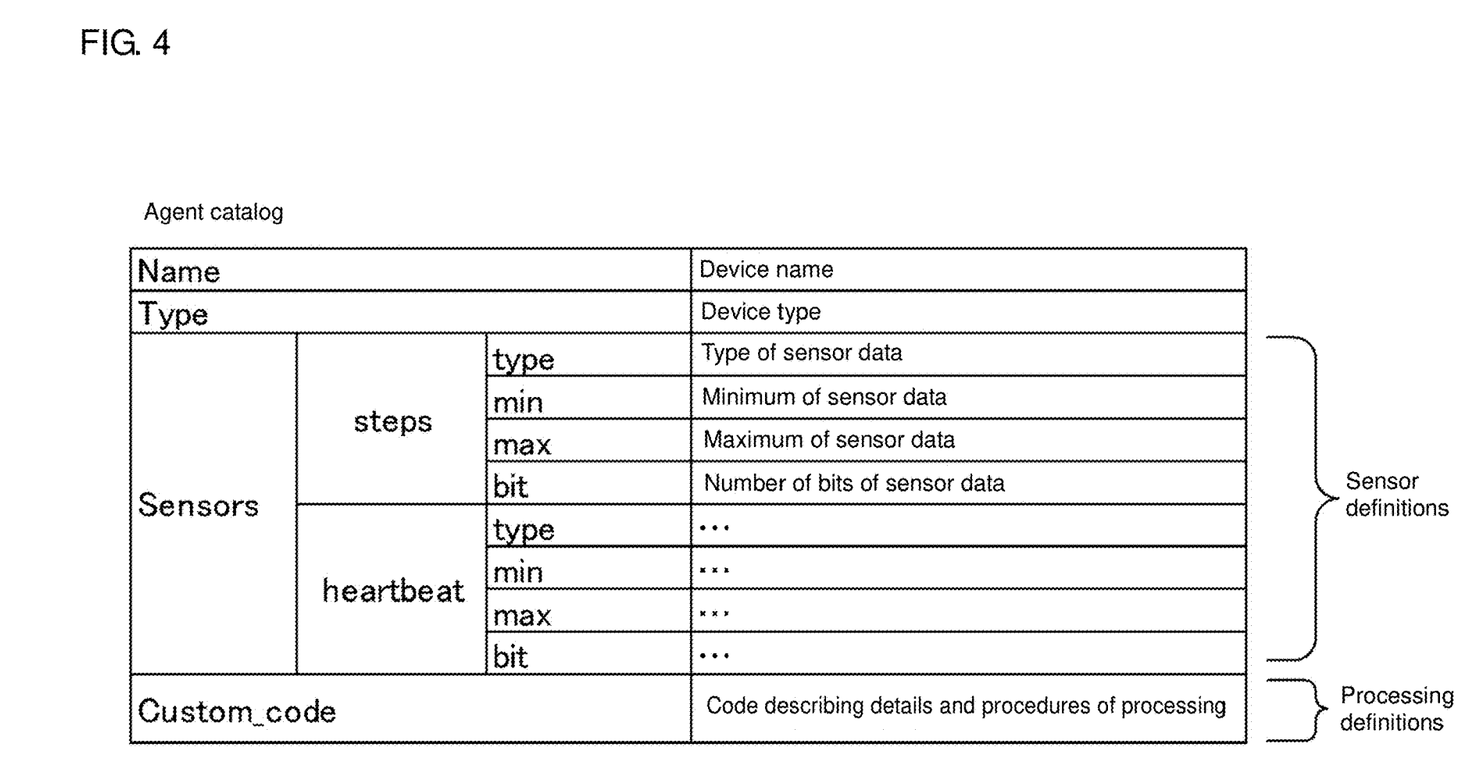
FIG. 4 is a diagram illustrating an example of an agent catalog for a smart device.

A catalog storage unit 32 stores information for generating the device agent (hereafter, an agent catalog). FIG. 4 shows an example of the agent catalog. In one or more embodiments, the agent catalog includes (1) a device name, (2) a device type, (3) details of sensor data obtainable by the device (hereafter, sensor definitions), and (4) code describing the details and the procedures of the processing to be performed using the sensor data (hereafter, processing definitions). Although shown in a tabular form in FIG. 4, the agent catalog may be in other formats in the same manner as the metadata. The agent catalog is transmitted in response to a request from the master device 10.

A method for generating a device agent using an agent catalog will be described later.

A catalog distribution unit 33 is a web server for distributing the agent catalogs stored in the catalog storage unit 32.

Figure 5:
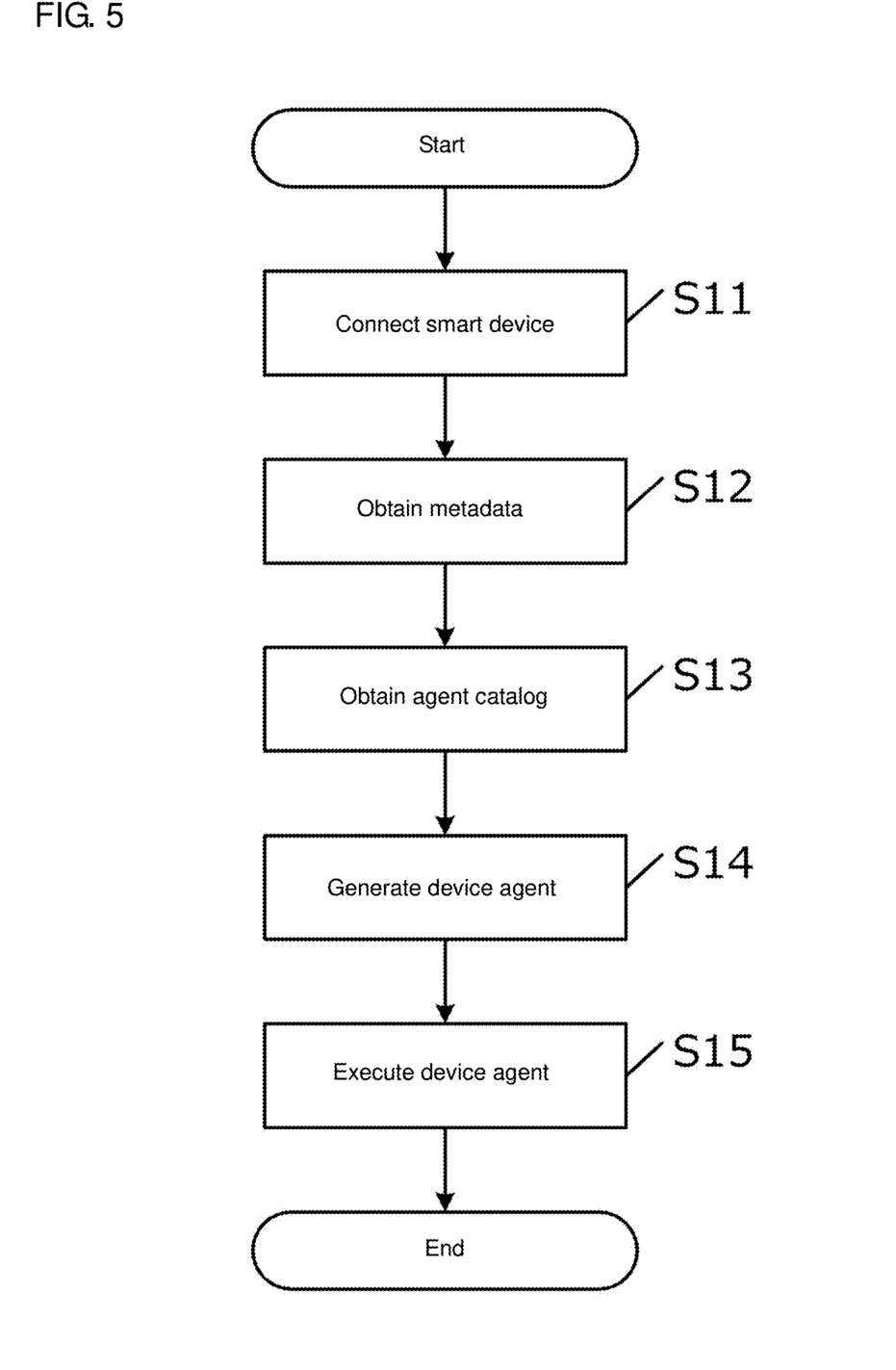
FIG. 5 is a flowchart illustrating the processing performed by a system according to a first embodiment.

The operation of the system will now be described with reference to a flowchart of FIG. 5 showing the processing performed by the devices. The operation starts when the smart device is connected to the master device and ends when the functions of the smart device are provided to the user.

The user first connects the smart device 20 to the master device 10 (step S11). The smart device 20 is wirelessly connected to the master device 10 using Bluetooth. Once paired, the smart device 20 may be automatically detected and connected subsequently.

After the smart device 20 is connected, the general agent execution unit 13 requests the smart device 20 to transmit metadata. The smart device 20 transmits its metadata stored in the metadata storage unit 23 (step S12).

The general agent execution unit 13 then accesses the URL included in the obtained metadata and obtains the agent catalog corresponding to the metadata (step S13). More specifically, the catalog distribution unit 33 receives an HTTP request, retrieves the corresponding agent catalog from the catalog storage unit 32, and transmits the agent catalog.

The general agent execution unit 13 then generates a device agent in accordance with the information contained in the obtained agent catalog (step S14).

As described with reference to FIG. 4, the agent catalog in one or more embodiments contains the details of the sensor data obtainable by the smart device (sensor definitions) and the details and the procedures of the processing to be performed using the sensor data (processing definitions).

The sensor definitions include information indicating, for example, the type, the number of bits, and the available range of the sensor data. The sensor definitions may also include information about a method for accessing the hardware.

The processing definitions include information indicating, for example, a method for processing or operating the sensor data and a method for generating information to be provided to the user, which are expressed in program code. The processing definitions may be in bytecode or may be described in a script language. The format may be independent of the architecture of the processor.

The sensor definitions and the processing definitions, which are separately described in one or more embodiments, may be integrated together. For example, the sensor definitions may be embedded in the program code.

The general agent execution unit 13 generates program code by applying the sensor definitions contained in the agent catalog to the processing definitions also contained in the agent catalog. The general agent execution unit 13 further generates an instance or specifically a device agent that executes the generated program code. This generates the device agent that obtains information from the sensor included in the smart device and performs predetermined processing using the information.

The generated device agent is executed by the device agent execution unit 14, which collects sensor data and provides information. For example, when a predetermined function associated with the smart device is to periodically obtain the number of steps and heartbeats and record the log and provide it to the user, the device agent periodically accesses the pedometer sensor and the heartbeat sensor included in the smart device 20 to collect the sensor data, and accumulates the collected sensor data to provide the information to the user through the input-output unit 15.

The device agent once generated is stored in the device agent execution unit 14 and is reused when the same smart device is connected. When another or a different smart device is connected, the same procedure is performed to generate and execute a new device agent corresponding to the newly connected device.

As described above, the agent system according to a first embodiment allows the device agent executed on the master device to perform the functions of the smart device on behalf of the smart device. The smart device thus functions simply as an input-output unit. This reduces the hardware resources of the smart device. The device agent operates on the master device that has more extra resources than the smart device.

This enables more functions to be performed than when the software operates on the smart device.

The master device automatically generates a device agent corresponding to a newly connected smart device using the agent catalog. Thus, the functions can be updated or exchanged freely in response to a request from the user. Additionally, the prescribed agent catalogs can allow devices from different vendors to co-reside on the same network.

Although one device agent is generated for one smart device in one or more embodiments, multiple device agents may be generated for one smart device. For example, multiple device agents each performing a different function may be generated for one smart device.

More specifically, the multiple device agents may include a device agent that obtains sensor data from a smart device including sensors, a device agent that issues instructions to a smart device including an actuator, and a device agent that generates a user interface. When multiple smart devices are connected, the device agents may include a single device agent that controls all of the smart devices and device agents each corresponding to a different one of the smart devices.

Although the metadata in one or more embodiments includes a URL at which an agent catalog is available, the metadata may simply contain information for identifying a smart device (e.g., a model code or a serial number). In this case, the general agent, which has obtained the information, may search the management server 30 for the corresponding agent catalog to retrieve the agent catalog. In other embodiments, the metadata may be directly transferred to the management server 30, and the management server 30 may provide the corresponding agent catalog.

Second Embodiment

Figure 6:
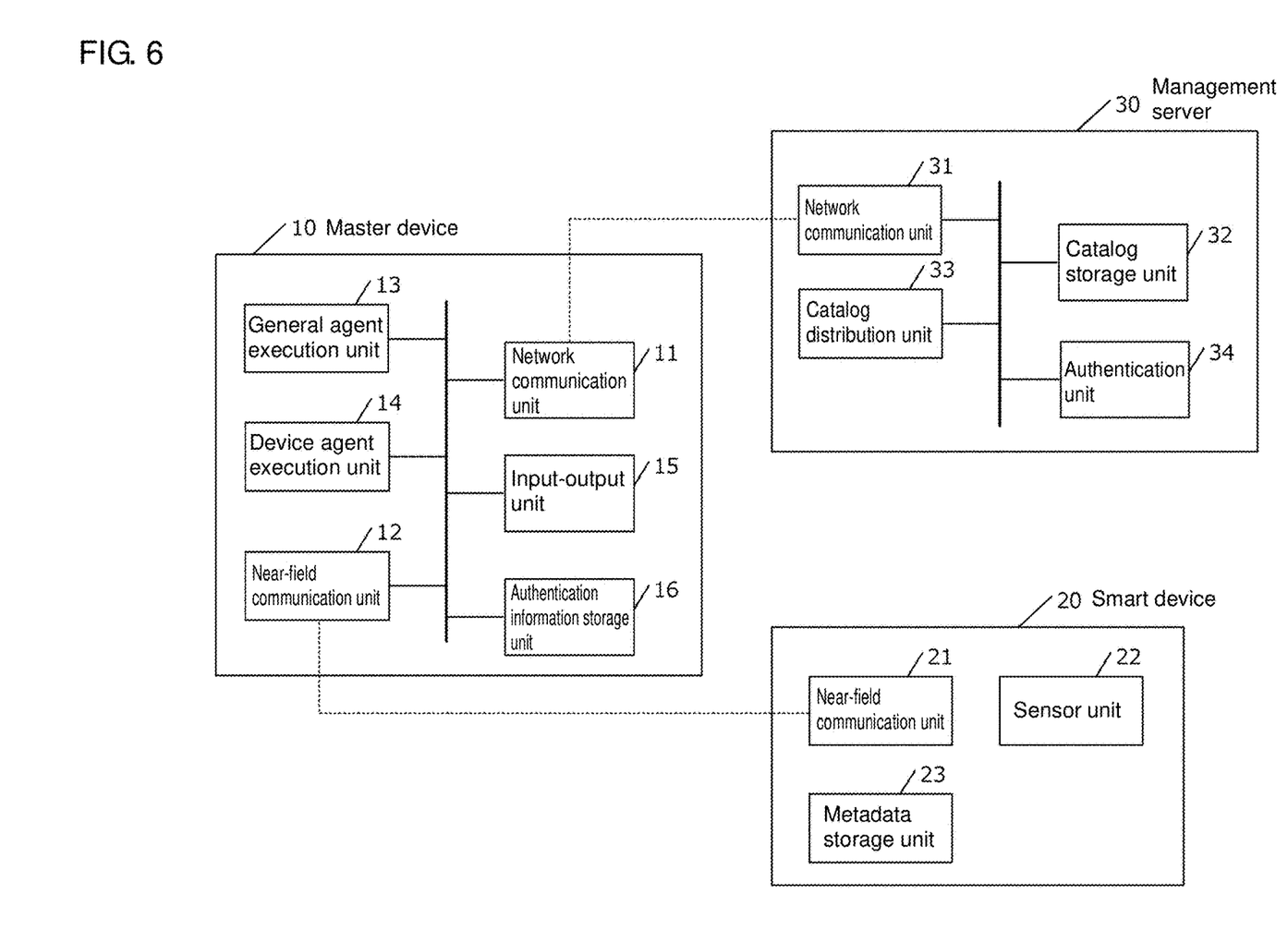
FIG. 6 is a functional block diagram illustrating an agent system according to a second embodiment.

A system according to a second embodiment includes a security unit added to each device in the agent system according to a first embodiment. FIG. 6 is a functional block diagram of each device included in the agent system according to a second embodiment.

A second embodiment differs from a first embodiment in that the master device 10 includes an authentication information storage unit 16 and in that the management server 30 includes an authentication unit 34.

A second embodiment further differs from a first embodiment in that the catalog storage unit 32 stores agent catalogs in a manner associated with the users of the system and in that the catalog distribution unit 33 provides the agent catalog to the user who has been authenticated based on a result of user authentication performed by the authentication unit 34 (described later).

The authentication information storage unit 16 stores authentication information corresponding to each user of the system. The authentication information includes information for electronically identifying a user, which may typically be a digital signature or may be a digital certificate. The authentication information corresponding to each user is generated when the devices are set up and is preliminary stored in the authentication information storage unit 16.

In a second embodiment, the master device 10 transmits the authentication information stored in the authentication information storage unit 16 to the management server 30. The management server 30 (authentication unit 34) performs user authentication.

The authentication unit 34 authenticates a user based on the authentication information transmitted from the master device 10. In one or more embodiments, the agent catalogs stored in the catalog storage unit 32 are normally protected and inaccessible without user authentication. Once the authentication unit 34 authenticates the user, the protection is canceled and the agent catalog corresponding to the authenticated user becomes available.

Figure 7:
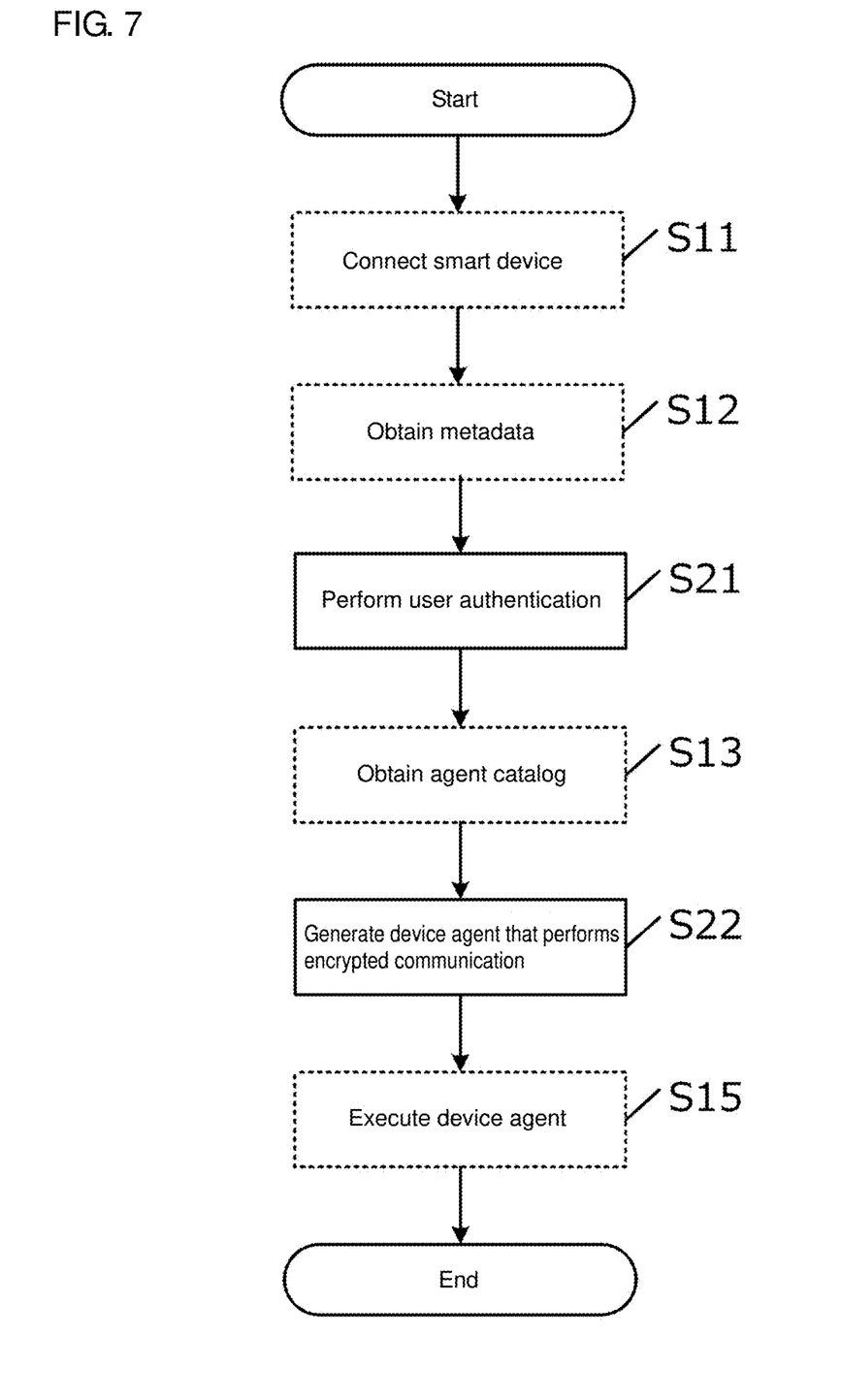
FIG. 7 is a flowchart illustrating the processing performed by a system according to a second embodiment.

FIG. 7 is flowchart showing the procedures performed by the devices in a second embodiment. The same processes as in a first embodiment are shown using dotted lines, and will not be described in detail.

In a second embodiment, step S12 is followed by user authentication or step S21, in which the general agent execution unit 13 transmits authentication information corresponding to the user to the management server 30, and the authentication unit 34 performs user authentication. This may cancel the protection of the agent catalog corresponding to the authenticated user so that the agent catalog becomes available.

Figure 8:
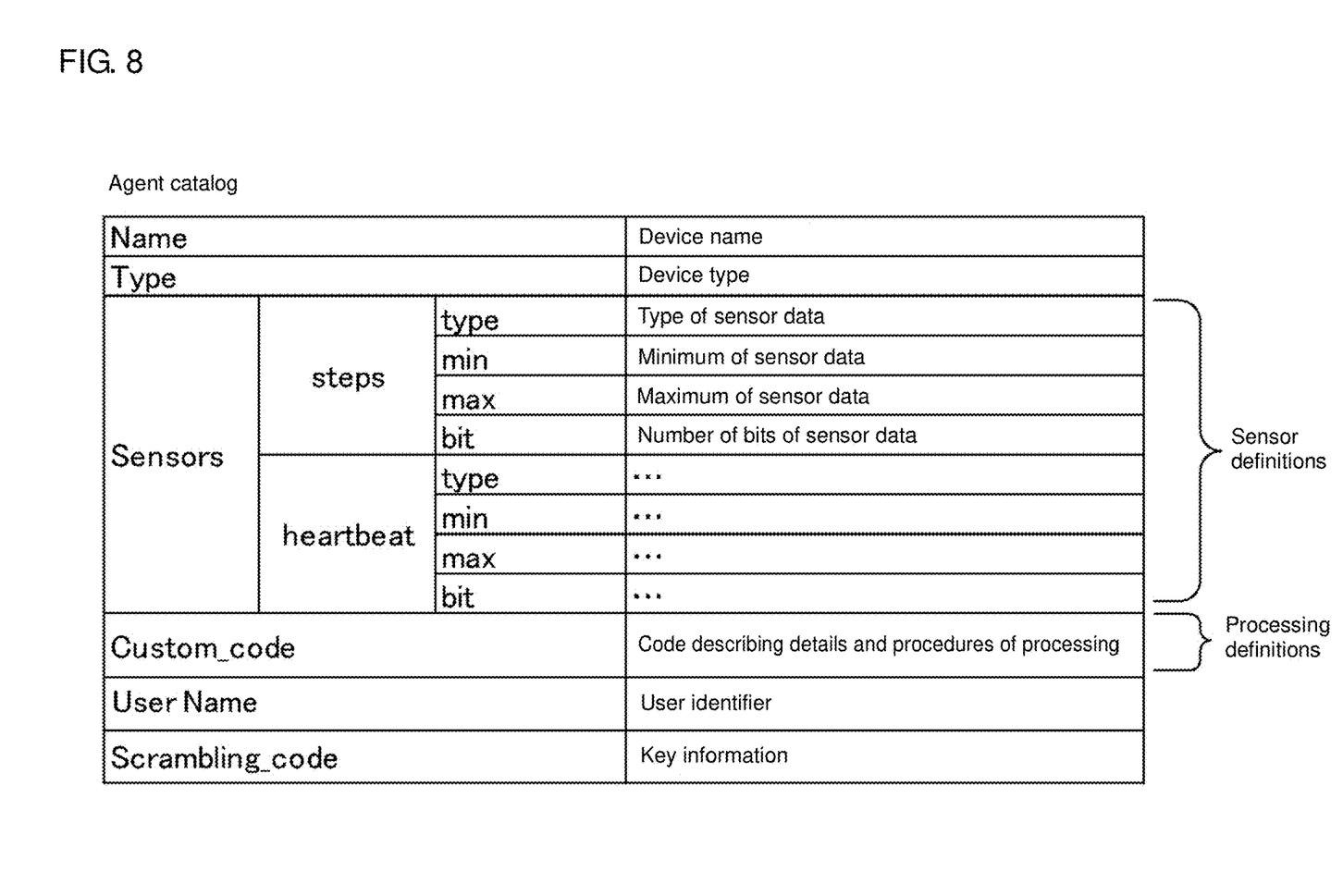
FIG. 8 is a diagram illustrating an example of an agent catalog according to a second embodiment.

FIG. 8 shows an example of the agent catalog according to a second embodiment. In a second embodiment, the agent catalog further contains an identifier of a user who is permitted to use the system, and key information (described later).

In step S22, the general agent generates the device agent in the same manner as in step S14. However, step S22 differs from step S14 in that the device agent to be generated performs encrypted communication with the smart device. More specifically, the processing definitions contained in the agent catalog include a logic for the encrypted communication, in which the above key information is used to enable the encrypted communication with the smart device. The encryption system may use a common key system or a public key system.

The system according to a second embodiment can determine whether to permit a user to use the smart device for each individual case. For example, the system may permit only the users who have subscribed to the service to use the agent.

The key information is assigned to each individual smart device registered in advance. This prevents another smart device simply replaced by the registered smart device from performing normal communication, or specifically prevents unauthorized smart devices from connecting to the master device 10 owned by an authorized user.

In one or more embodiments, the communication between the device agent and the smart device is encrypted. In some embodiments including multiple device agents operating on the master device 10, the communication between the device agents may also be encrypted. This modification may also use the key information contained in the agent catalog.

The device agent may further communicate with external information processing devices (hereafter, external devices) to receive services. In this case, the device agent may use authentication information of the user to limit the external devices (services) with which information is exchangeable.

For example, the device agent uses the catalog information of the smart device to specify available services from the services provided through the Internet. The device agent then presents the available service candidates to the user. The user then selects a service from the service candidates and subscribes to the selected service.

The authentication information corresponding to the user is then transmitted to the external device that provides the service. The external device communicates with the device agent using the authentication information. More specifically, any external device without the authentication information (e.g., a relay server) is prevented from communicating with the device agent. This creates a secure network.

Any external device permitted by the owner of the smart device may participate in the secure network.

The external device may be the same device as the management server.

Modifications

The above embodiments are mere examples. The embodiments may be appropriately changed without departing from the spirit and scope of the invention.

For example, the system according to the above embodiments includes a smartphone owned by the user as the master device. In some embodiments, any device connected to the network may function as the master device. For example, the master device may be a nonmobile computer, a gateway device, or a router device.

In the above embodiments, the external device is a wearable device. In some embodiments, the external device may be any hardware with fewer resources than the master device. For example, the external device may be an embedded computer in a household electrical appliance. The external device herein may not be a computer that performs mathematical operations. For example, the external device may be a piece of hardware designed exclusively for obtaining information (e.g., a sensor device).

In the above embodiments, the external device is used to obtain information. In some embodiments, the external device may be used to output information, or may be an actuator that provides effects to external objects.

REFERENCE SIGNS LIST 10 master device
11, 31 network communication unit
12, 21 near-field communication unit
13 general agent execution unit
14 device agent execution unit
15 input-output unit
20 smart device
22 sensor unit
30 management server
32 catalog storage unit
33 catalog distribution unit

The invention claimed is:

1. An agent system, comprising:
an information processing device configured to execute, using hardware included in at least one external device as an interface, an agent that performs processing predetermined for each external device on behalf of the external device; and
a server device, wherein:
the information processing device comprises a processor configured with a program to perform operations comprising:
operation as a device information obtaining unit configured to obtain device information about processing to be performed by the agent on behalf of the external device; and
operation as an agent generation unit configured to generate the agent using the device information;
the server device comprises a processor configured with a program to perform operations comprising:
operation as a storage unit configured to store the device information corresponding to the at least one external device; and
operation as a device information providing unit configured to transmit device information in response to a request from the information processing device;
the storage unit stores the device information in association with a user;
the device information obtaining unit transmits authentication information corresponding to the user to the server device; and
the device information providing unit transmits only device information corresponding to the user indicated by the authentication information among the device information stored in the storage unit to the information processing device an identification unit configured to identify at bast one external device.

2. The agent system according to claim 1, wherein the processor of the information processing device is configured with the program such that operation as the device information obtaining unit comprises obtaining metadata from the external device, the metadata being data for identifying the external device.

3. The agent system according to claim 2, wherein the processor or the information processing device is configured with the program such that operation as
the device information obtaining unit comprises obtaining the metadata from the external device upon connection to the external device.

4. The agent system according to claim 2, wherein
the metadata includes a location at which the device information is available on a network, and
the processor of the information processing device is configured with the program such that operation as the device information obtaining unit comprises obtaining the device information from the location specified in the metadata.

5. The agent system according to claim 2, wherein
the device information includes first information about data obtainable by the external device and second information about processing to be performed using the data, and
the agent performs the predetermined processing using the first information and the second information.

6. The agent system according to claim 3, wherein
the metadata includes a location at which the device information is available on a network, and
the device information obtaining unit obtains the device information from the location specified in the metadata.

7. The agent system according to claim 3, wherein
the device information includes first information about data obtainable by the external device and second information about processing to be performed using the data, and
the agent performs the predetermined processing using the first information and the second information.

8. The agent system according to claim 4, wherein
the device information includes first information about data obtainable by the external device and second information about processing to be performed using the data, and
the agent performs the predetermined processing using the first information and the second information.

9. The agent system according to claim 1, wherein
the device information includes key information linked to the external device, and
the agent uses the key information to perform encrypted communication with the external device.

10. The agent system according to claim 1, wherein the agent communicates with solely an external device having authentication information identical to the authentication information corresponding to the user, and the external device is one of the at least one external device connected to the information processing device.

11. The agent system according to claim 9, wherein the agent communicates with solely an external device having authentication information identical to the authentication information corresponding to the user, and the external device comprises one of the at least one external device connected to the information processing device.

12. A non-transitory computer-readable storage medium storing a program causing an information processing device, configured to execute, using hardware included in at least one external device as an interface, an agent that performs processing predetermined for each external device on behalf of the external device, and a server device to perform operations comprising:

obtaining device information about processing to be performed by the agent on behalf of the external device;

generating the agent using the device information;

storing the device information corresponding to the at least one external device; and transmitting device information in response to a request from the information processing device, wherein:

storing the device information comprises storing the device information in association with a user;

obtaining the device information further comprises transmitting authentication information corresponding to the user to the server device; and transmitting the device information further comprises transmitting only device information corresponding to the user indicated by the authentication information among the stored device information to the information processing device.

* * * * *